United States Patent
Blitstein et al.

[11] Patent Number: 5,516,584
[45] Date of Patent: May 14, 1996

[54] PRIMERLESS PIPELINE COATING TAPE

[75] Inventors: John Blitstein; David McVey; Ken Konopka, all of Chicago; Donald H. Kathrein, Northbrook, all of Ill.

[73] Assignee: T C Manufacturing Co., Inc., Evanston, Ill.

[21] Appl. No.: 285,068

[22] Filed: Aug. 3, 1994

[51] Int. Cl.$^6$ .............................. B32B 27/06; B32B 27/26
[52] U.S. Cl. ...................... 428/359; 428/411.1; 428/500; 428/519; 428/523; 525/98
[58] Field of Search .............................. 428/35.9, 411.1, 428/500, 519, 523; 525/98

[56] References Cited

U.S. PATENT DOCUMENTS

| | | |
|---|---|---|
| 3,607,516 | 9/1971 | Royston . |
| 3,625,259 | 12/1971 | Kennedy, Jr. . |
| 3,757,829 | 9/1973 | Berry et al. . |
| 3,874,418 | 4/1975 | Hielema . |
| 4,148,959 | 4/1979 | Csikos et al. . |
| 4,192,697 | 3/1980 | Parker et al. . |
| 4,287,034 | 9/1981 | Pieslak et al. . |
| 4,437,495 | 3/1984 | Zonsveld . |
| 4,499,136 | 2/1985 | Nakamura et al. . |
| 4,802,509 | 2/1989 | Brandolf . |
| 5,248,532 | 9/1993 | Sawada .................... 428/35.2 |

FOREIGN PATENT DOCUMENTS 0119857  7/1983  Japan .

*Primary Examiner*—Joseph L. Schofer
*Assistant Examiner*—I. Zemel
*Attorney, Agent, or Firm*—Lee, Mann, Smith, McWilliams, Sweeney & Ohlson

[57] ABSTRACT

A article for wrapping objects comprising a plurality of layers, including a first layer of a wrap material, an intermediate layer of an adhesive material and an inner layer of a solids material, said article providing resistance to cathodic disbondment from said object at least equal to an adhesive bearing wrap applied with a solvent based primer.

6 Claims, No Drawings

PRIMERLESS PIPELINE COATING TAPE

FIELD OF THE INVENTION

The present invention relates to the bonding of wrappings to pipes and other objects to protect them from corrosion and wear. The pipes and other objects may be underground, or they may be located in highly corrosive industrial settings, or simply located outdoors.

Steel and iron corrodes when exposed to the environment, due to electrochemical reactions in which the pipe loses iron ions to water located at the surface of the pipe at a localized anodic region on the pipe. To prevent the development of these anodic regions and corresponding corrosion of the surface, an electric current is sometimes imposed along the length of the pipe. The pipe is connected to a negative electric potential, thus causing the pipe to act as a cathode. A sacrificial anode of some other metal corrodes away and is replaced periodically. In this way, further loss of iron ions is prevented. It is known that adhesive compositions generally used to bond a protective wrap or tape to a pipe are adversely affected by this imposed electrical current. The current weakens the adhesive bond between the tape or wrap and the pipe, causing the tape or wrap to separate from the pipe, exposing more pipe surface to corrosive conditions in the environment. Those skilled in the art refer to this process as "cathodic disbonding."

BACKGROUND OF THE INVENTION

Wrapping pipe to prevent corrosion and wear has been well known since the 1940's. The method established at that time has changed little, although the materials used to make the wrap and bond it to the pipe have improved. The abilities of these products to perform satisfactorily have been almost universally dependent upon applying a solvent based primer directly on to the properly cleaned pipe surface prior to application of the hot or cold-applied tapes, shrink sleeves or other pipe-line coatings. The solvent based primers used for coating the pipe surface consist of some combination of organic solvent with elastomeric/resin based solid materials dissolved therein. The solvents act as a vehicle to carry the solids for deposition on the pipe surface. The solvent evaporates after application to produce a dry but flexible solid coating on the pipe surface. This "primer coating" then acts to enhance all of the vital functions of the tape, shrink sleeve or coating adhesive bonding systems.

Most, if not all, corrosion engineers believe the premise that to properly protect pipes from corrosion, application of the proper primer before the application of pipeline coatings is essential. It was generally believed that the solvent portion of the solvent based primer was necessary to achieve a wetting/bonding action on the cleaned pipe surface, which caused the solids portion of the solvent based primer to bond effectively to the pipe, thus enhancing the bonding of the adhesive bonding surface of the tapes or shrink sleeves. The belief in the industry was that a wet primer application is an integral part of the total tape or shrink sleeve wrapping system. Thus, the result obtained from the current invention, elimination of the primer, was unexpected and highly desirable.

Application of tape, shrink sleeve or wrap in the conventional manner was complicated and labor intensive. First, the pipe to be wrapped had to be thoroughly cleaned. Next, a solvent based primer was manually applied to the pipe, and the solvent was allowed to evaporate into the environment. Third, the wrap, including the adhesive, was applied to the pipe. This process created several difficulties.

First, the individual applying the primer must decide how much to use. Too little primer did not generate the strength of bond necessary and gave poor results. Too much primer wasted material, increased costs and also gave poor results. It was necessary to spend time training the individual doing the application of the primer to get the best results.

Second, it was necessary to match the primer with the adhesive on the wrap. Not all primers matched up correctly with any adhesive, and a mismatch would result in a complete failure to adhere to the pipe.

Third, the process of applying the primer was labor intensive. The person making the application must do the job manually, usually with a brush.

Fourth, the primer was environmentally unsound. The primers were typically composed of 75–85% solvents, and 15–25% solids. Many of the primers were highly flammable due to the high solvent content, and furthermore, some were toxic and/or carcinogenic. After the primer was applied, the solvent was allowed to evaporate into the environment, leaving the solids behind. The wrap with the adhesive was then applied on top of the remaining solids that coated the pipe. However, many tons of solvent evaporated into the environment during this process. These solvents included methyl ethyl ketone, toluene and xylene.

Many efforts have been made to eliminate primers. One such effort revolves around the use of epoxy resins applied to the surface of the pipe before applying the wrap to the pipe. Epoxy resin treatment suffers from many problems, including high cost, the toxicity of the amines used in the process, the limited pot life of the amines, the long curing times involved and temperature restrictions. For example, epoxy resins usually take an hour to cure, and thus the wrap cannot be applied for this length of time. The resins cannot be applied below 50° F. Thus, epoxy resins suffer from high costs, use limitations and risks of environmental danger that make it impractical to use.

Other efforts have failed to produce the proper results. When a wrap is tested, the standard test is the cathodic disbondment test, ASTM G-8. In the cathodic disbondment test, a ¼" hole is drilled through the outer wrap and the pipe, the pipe is then immersed in a 3% salt solution, and a 1.5 V current is impressed on the pipe. The amount of disbondment is then measured after 30 days in this environment. Prior efforts to make a primerless wrap have failed to give results about the same as those results achieved by the old method of applying the primer and then the wrap. The inventors of the primerless tape or shrink sleeve of this application increased the severity of the test by running the voltage at 3 V for 60 days to be sure it was equal to or better than primer applied tape.

Under the harsher conditions utilized by the inventors, with neither a primer nor the solids material used, the amount of disbondment ranges from 7 to 8 square inches. When primer or the solids material of the instant invention are used, the amount of disbondment is usually well under 2 square inches, but anything under 3 square inches is considered acceptable.

Still other efforts to create a primerless wrap have failed from the very beginning. Early efforts at generating a primerless wrap included simply evaporating the solvents from the primer, and then attempting to apply the solids remaining to the wrap plus the adhesive. These efforts failed because the viscosity of the remaining solids was too high; the solids set up and did not flow. Furthermore, even when the remaining solids were forced onto the wrap plus the adhesive, the mixture failed the cathodic disbondment test.

Other wraps require application with heat, and did not provide the same excellent results in the cathodic disbondment tests as the current invention. The inventors of the primerless tape of this application initially attempted to create a hot melt, using temperature to overcome the viscosity problems, and apply the hot melt to the wrap plus adhesive. These efforts failed to overcome the viscosity problems, and the inventors were forced to try different materials to achieve a blend with the viscosity desired.

SUMMARY OF THE INVENTION

It is an object of this invention to create solids material in a tape form which functions like a primer.

It is a further object of this invention to create a solids material that resists cathodic disbonding because the solids material remains flexible like the material. remaining after a primer application.

It is an further object of this invention to provide a primerless wrap-adhesive-solids tape or shrink sleeve that can be used without solvent-based primers to protect pipes and other objects.

It is a further object of this invention to provide a primerless wrap-adhesive-solids tape or shrink sleeve that eliminates the use of harmful solvents that may be carcinogenic, flammable or detrimental to the environment.

It is a further object of this invention to create a primerless wrap-adhesive-solids tape or shrink sleeve that obtains the same results from the cathodic disbonding test as does the conventional wrap-adhesive plus the primer coated pipe.

It is a further object of this invention to create a primerless wrap-adhesive-solids tape or shrink sleeve so that the step of applying the primer to the pipe may be eliminated.

It is a further object of this invention to create a primerless wrap-adhesive-solids tape or shrink sleeve that creates a consistent layer of 3–4 mils of solids in the wrap-adhesive-solids combination.

It is a further object of this invention to create a primerless wrap-adhesive-solids tape or shrink sleeve that eliminates the problem of matching the proper adhesive with the proper primer.

It is a further object of this invention to create a primerless wrap-adhesive-solids tape or shrink sleeve that need not be applied with heat.

It is a further object of this invention to create a primerless wrap-adhesive-solids tape or shrink sleeve that is less expensive in overall costs than the current methodology of applying primers and then applying the wrap plus adhesive. For example, in addition to the obvious savings from reduced man-power in the elimination of the primer application step, further savings will be realized through reduced shipping costs, reduction of inventory items and elimination of unnecessary containers that the primers were shipped in. Savings will be also be realized by the elimination of the solvents. Further and other objects of the invention will be realized by those skilled in the art from the following detailed description of the invention.

These and the other objects of the invention are satisfied by a primerless wrap-adhesive-solids tape or shrink sleeve that can be applied to the pipe immediately after the pipe is cleaned, and which produces the same results for protection as does the conventional use of primers and tape. The wrap can be made of any conventional material such as rubber, a polyolefin such as polyethylene or polypropylene, polyvinyl chloride or cross-linked polyethylene.

The adhesive component can be any adhesive typically used to bond corrosion protection coatings to metal pipes or other substrates, and particularly those generally used to bond a coating to a pipeline which will carry an impressed current. Such adhesives include, but are not limited to, hot melt adhesives such as those based on thermoplastic polyamides, polyolefins, polyesters, polyurethanes, polysulfides, and hot melt adhesives such as ethylene copolymers, for example copolymers of ethylene with vinyl acetate, maleic anhydride, acrylic acid, methacrylic acid or an alkyl acrylate such as ethyl acrylate. Mastics may also be used such as low molecular weight polyisobutylene based mastic compositions.

The adhesive composition can also contain additives such as tackifiers, fillers, waxes, rubbers and stabilizers. Tackifiers that are used include, but are not limited to, phenolformaldehyde resins, hydrocarbon resins, vinyl toluene-alphamethyl styrene copolymers, polyterpenes and phenol-terpene resins. Other tackifiers that can be used include pigments and reinforcing agents such as carbon black.

The solids layer, i.e. the substitute for the primer, usually has, but is not required to have, a viscosity in the range of 13,600 centipoise at 300° F. to 6,000 centipoise at 350 ° F. The layer will have a specific gravity of around 0.975 in the preferred embodiment with a Sag Point 172° F. and Softening Point according to ASTM E-28 of 180 ° F. The solids layer may be comprised of a combination of a thermoplastic elastomer, a resin material, a polyolefin and an anti-oxidant.

The thermoplastic elastomer can be a pure polymer, a polymer modified by oil, a polymer modified by plasticizers, or a polymer modified by resins or other fillers. When the thermoplastic elastomer is a pure polymer, it is usually a linear polymer structure such as styrene-isoprene-styrene (SIS), or styrene-ethylene/butylene-styrene (SEBS). It may also be a di-block polymer structure such as styrene-ethylene-propylene (SEP), or styrene- ethylene-butylene (SEB). It may further be a tri-block polymer structure or a branched radial polymer structure such as (styrene-butadiene)m (SBm).

The resin material in the solids layer can be a pure polymer, a polymer modified by oil, a polymer modified by plasticizers, a polymer modified by a thermoplastic elastomer, or a polymer modified by a suitable filler. The materials found to achieve acceptable results is a phenolic resin. A highly alkylated, low molecular weight, phenolic-modified terpene resin will achieve the best results.

The polyolefin can be a pure polymer such as a naphthenic oil, or a polymer modified with a suitable filler.

The solids layer produces the best results on the cathodic disbondment test when composed of 35% by weight of Vector 4113, a general purpose styrene-isoprene-styrene copolymer with diblock made by Dexco Polymers, or any other styrene-isoprene-styrene copolymer, 53% Piccofyn A-135, a highly alkylated, low molecular weight (400–600) phenolic-modified terpene resin made by Hercules, or any other highly alkylated, low molecular weight phenolic-modified terpene resin, 10% Shellflex-371, a polyolefin made by Shell Oil Co., 1% antioxidant of 2,2'-Methylene-bis (4-methyl-6-tertiary-butyl phenol) sold under the tradename Cyanox by Cyanmide and 1% Polygard, an antioxidant made by Uniroyal Chemical.

Vector 4113 is a general purpose styrene-isoprene-styrene copolymer with diblock. The percent styrene content is about 15 and the percent diblock is 18. The Vector 4113 acts as a hot melt and supplies the rubber like qualities that bonds to the surface of the metal. The Vector 4113 also supplies some tackiness to the solids layer. It further provides strength to the chemical bonds between the adhesive layer and the surface of the steel.

Piccofyn A-135 is a highly alkylated, low molecular weight, phenolic-modified terpene resin. Piccofyn A-135 has a softening point of 135° C., a density of 8.58 lbs/gal at 25° C., a zero percent methylol content, a flash point of 268° C., and melt viscosities of 1 poise at 220° C., 10 poises at 190° C. and 100 poises at 165° C.

Shellflex-371, CAS # 64742-18-3, is a naphthenic oil. The molecular analysis, Clay-Gel, by percent weight is 0% asphaltenes, 0.3% polar compounds, 10.0% aromatics and 89.7% saturates. The carbon atom analysis, in percent, is 1% aromatic carbon atoms, 45% naphthenic carbon atoms, and 53% paraffinic carbon atoms. The estimated molecular weight is 400. The refractive index is 1.489. The flash point, C.O.C., °F. is 420. The specific gravity is 0.898. Finally, the viscosity is 410 SSU/100° F. and 52 SSU/210° F. The Shellflex-371 material lowers the viscosity of the solids material and improves the tackification. The Shellflex-371 allows the material to be utilized at lower temperature ranges.

Cyanox is an anti-oxidant, chemical formula 2,2'-Methylene-bis (4-methyl-6-tertiary-butyl phenol). Polyguard is also an anti-oxidant, and is a 50—50 mixture of mono and dinonylphenyl phosphite.

Other products used in testing included Tufflo 6026 and Kraton D1107. Tufflo 6026, manufactured by Lyondell Petrochemical Company, is a technical grade white mineral oil with the following chemical properties: Viscosity (SUS) at 100° F.—205, at 212° F.—47; Gravity, °API—32.2; Specific Gravity @ 60/60° F.—0.8644; Density (lbs/gal) 7.20; flash point, ° F.—410; pour point ° F.—+15; aniline point, ° F.—236; refractive index @ 20° C.—1.4700; molecular weight—425; and volatility, 22 hrs @ 225° F.—1.6.

Kraton D1107, manufactured by Shell Oil Co., is a styrene-isoprene-styrene block copolymer thermoplastic elastomer with the following physical properties: tensile strength, psi—3,100; 300% Modulus, psi—100; Elongation, %—1,300; Set at Break %—10; Hardness, Shore A—37; Specific Gravity—0.92; Brookfield viscosity (toluene solution), cps at 77° F.—1,600; and styrene to rubber ratio—14/86.

Other thermoplastic elastomers that can be used include, but are not limited to, Kraton D1101, Kraton D1107, Kraton D1116, Kraton D1118X, Kraton D1650, Vector 4111 and Vector 4461-D. Shell Oil Company sells the Kraton products and Dexco Polymers sells the Vector products.

Other resin materials that can be used include, but are not limited to, Tufflo 6026, Nirez 2019, Durez 12603 and Schenectady SP-553. Tufflo 6026, Nirez 2019, Durez 12603 and Schenectady SP-553 are sold by Lyondell Lubricants, Arizona Chemical, Occidental Chemical and Schenectady Chemical, respectively.

Other polyolefins that can be used include, but are not limited to, Nevchem 100, Cumar LX 509 and Cumar R 12 A. Nevchem and the Cumar products are manufactured by Neville.

The following table summarizes the product formulation:

| Product | Vendor | Preferred Embodiment | Range |
| --- | --- | --- | --- |
| Vector 4113 | Dexco Polymers | 35% | 10–55% |
| Piccofyn A-135 | Hercules | 53% | 25–75% |
| Shellflex 371 | Shell Oil Co. | 10% | 0–25% |
| Cyanox 2246 | Cyanamide | 1% | 0–3% |
| Polygard | Uniroyal Chemical | 1% | 0–3% |

The following examples illustrate the invention. In these examples, the primerless solids layer was prepared using various formulations. The primerless solids layer was tested for resistance to cathodic disbondment by using the primerless solid, adhesive and tape wrap to protect a steel pipe. The wrapped pipe was then tested by a modification of ASTM G-8 (the voltage was increased to 3 V and the length of exposure was 60 days) to determine the resistance of the wrap-adhesive-solids combination to cathodic disbondment.

EXAMPLES 1–5

A number of different solids mixtures were prepared and tested using ASTM G-8, the cathodic disbondment test. The wrap was Tapecoat CT 10/40W, manufactured by Tapecoat Co., a division of TC Manufacturing Co., the assignee of this application. This wrap is actually 10 mils of polyethylene backing with 40 mils of adhesive attached. The adhesive was CT-9, manufactured by Tapecoat Co. CT-9 is a combination of elastomers, tackifiers, plasticizers and inert fillers. Any standard adhesive could have been utilized in the testing, however. Five mils of solids material was applied onto the wrap plus adhesive, to create the wrap-adhesive-solids combination of the invention.

The control samples where tested using Tapecoat CT 10/40W as the wrap, CT-9 as the adhesive, and utilizing a primer consisting of toluene, methylene chloride and 10% solids of butyl rubber. The control samples were quality control tests of actual production runs of standard Tapecoat products, thus some examples will have more than one control, and some will have no control at all.

The following table shows the number of different formulas tested:

| Formula Primer # | Composition |
| --- | --- |
| Test No. 1 | |
| KK-3-103D | 36% Piccofyn 135; 19% Kraton D1107; 45% Tufflo 6026 |
| KK-3-101D | 70% Piccofyn 135; 30% Kraton D1107 |

| Formula Primer # | Area of Disbondment |
| --- | --- |
| Results from Test No. 1 | |
| KK-3-103D | 1.04 square inches |
| KK-3-101D | 1.30 square inches |
| Control | 1.16 square inches |

| Formula Primer # | Composition |
| --- | --- |
| Test No. 2 | |
| KK-3-120A | 70% Piccofyn 135; 30% Kraton D1107 |
| KK-3-101D | 70% Piccofyn 135; 30% Kraton D1107 |
| KK-3-120B | 36% Piccofyn 135; 19% Kraton D1107; 45% Tufflo 6026 |

7
-continued

| Formula Primer # | Area of Disbondment |
|---|---|
| Results from Test No. 2 | |
| KK-3-120A | 1.30 square inches |
| KK-3-101D | 2.60 square inches |
| KK-3-120B | 2.71 square inches |
| Control | 2.51 square inches |

| Formula Primer # | Composition |
|---|---|
| Test No. 3 | |
| DM-93-01-28-06 | 37.5% Vector; 60.5% Piccofyn; 1% Cyanox; 1% Polyguard |
| DM-93-01-28-08 | 42.5% Vector; 55.5% Piccofyn; 1% Cyanox; 1% Polyguard |
| DM-93-01-28-10 | 47.5% Vector; 50.5% Piccofyn; 1% Cyanox; 1% Polyguard |

| Formula Primer # | Area of Disbondment |
|---|---|
| Results from Test No. 3 | |
| DM-93-01-28-06 | 1.34 square inches |
| DM-93-01-28-08 | 1.32 square inches |
| DM-93-01-28-10 | 1.01 square inches |
| Control | 1.19 square inches |

| Formula Primer # | Composition |
|---|---|
| Test No. 4 | |
| DM-93-02-04-03-02 | 30% Vector; 58% Piccofyn; 10% Shellflex; 1% Cyanox; 1% Polyguard |
| DM-93-02-04-05-02 | 35% Vector; 53% Piccofyn; 10% Shellflex; 1% Cyanox; 1% Polyguard |
| DM-93-02-04-07-02 | 40% Vector; 48% Piccofyn; 10% Shellflex; 1% Cyanox; 1% Polyguard |
| DM-93-02-02-04-01 | 32.5% Vector; 60.5% Piccofyn; 5% Shellflex; 1% Cyanox; 1% Polyguard |
| DM-93-02-02-06-01 | 37.5% Vector; 55.5% Piccofyn; 5% Shellflex 1% Cyanox; 1% Polyguard |
| DM-93-02-02-08-01 | 42.5% Vector; 50.5% Piccofyn; 5% Shellflex; 1% Cyanox; 1% Polyguard |

| Formula Primer # | Area of Disbondment |
|---|---|
| Results from Test No. 4 | |
| DM-93-02-04-03-02 | 0.97 square inches |
| DM-93-02-04-05-02 | 0.59 square inches |
| DM-93-02-04-07-02 | 1.09 square inches |
| DM-93-02-02-04-01 | 0.89 square inches |
| DM-93-02-02-06-01 | 0.83 square inches |
| DM-93-02-02-08-01 | 0.92 square inches |
| Control | 0.60 square inches |
| Control | 1.19 square inches |

| Formula Primer # | Composition |
|---|---|
| Test No. 5 | |
| DM-93-01-28-06 | 37.5% Vector; 60.5% Piccofyn; 1% Cyanox; 1% Polyguard |
| DM-93-01-28-08 | 42.5% Vector; 55.5% Piccofyn; 1% Cyanox; 1% Polyguard |
| DM-93-01-28-10 | 47.5% Vector; 50.5% Piccofyn; 1% Cyanox; 1% Polyguard |

| Formula Primer # | Area of Disbondment |
|---|---|
| Results from Test No. 5 | |
| DM-93-01-28-06 | 0.95 square inches |
| DM-93-01-28-08 | 1.10 square inches |
| DM-93-01-28-10 | 0.65 square inches |

8

Thus, from the tests it can be seen that wrap-adhesive-solids combination gave results that were often superior to the conventional wrap-adhesive-primer controls. It can also be seen that variations of up to 0.65 square inches may be seen between the control samples. Thus, the results that were slightly higher or slightly lower the controls were considered to be acceptable, as long as they were within 0.65 square inches. The majority of the results were lower, and was slightly lower in the preferred embodiment.

Various features of the invention have been particularly shown and described in connection with the embodiment of the invention, however, it must be understood that these particular arrangements merely illustrate the invention only. The invention is not limited to those shown here in the specification and the invention is to be given its fullest interpretation within the terms of the appended claims.

We claim:

1. An article for wrapping objects, said article comprising a plurality of layers, including:
    a first layer of a wrap material;
    an intermediate layer of a flexible, adhesive material; and
    an inner layer of a flexible solids material, said solids material being comprised of:
        (a) from 10 to 55 weight percent thermoplastic elastomer;
        (b) from 27 to 75 weight percent resin material;
        (c) from 0 to 25 weight percent polyolefin; and
        (d) from 0 to 3 weight percent anti-oxidant,
    where said thermoplastic elastomer is selected from the group consisting of SIS or SEBS tri-block copolymers, SEP or SEB di-block copolymers and styrene-butadiene branched block copolymers, where S is a polymeric styrene block, B is a polymeric butadiene block, I is a polymeric isoprene block, EP is a polymeric ethylene/propylene block and EB is a polymeric ethylene-butylene block; n>1;
    where said resin material is selected from the group consisting of white mineral oil, phenolic resin and a phenolic-modified terpene resin;
    where said polyolefin is selected from the group consisting of naphthenic oil and naphthenic oil modified with a filler;
    wherein said article provides resistance to cathodic disbondment from said object at least equal to an adhesive bearing wrap applied with a solvent based primer.

2. An article in accordance with claim 1, wherein said wrap material is a rubber material.

3. An article in accordance with claim 1, wherein said adhesive material is a hot melt adhesive.

4. An article for wrapping objects, said article comprising a plurality of layers, including:
    a first layer of a wrap material;
    an intermediate layer of a flexible, adhesive material; and
    an inner layer of a flexible solids material, said solids material being comprised of:
        (a) from 10 to 55 weight percent thermoplastic elastomer of block copolymers;
        (b) from 27 to 75 weight percent resin material where said resin material is selected from the group consisting of white mineral oil, phenolic resin and phenolic-modified terpene resin;

(c) from 0 to 25 weight percent polyolefin where said polyolefin is selected to lower the viscosity of said solids material of said solids material; and (d) from 0 to 3 weight percent anti-oxidant, wherein said article provides resistance to cathodic disbondment from said object at least equal to an adhesive bearing wrap applied with a solvent based primer.

5. An article in accordance with claim 4, wherein said antioxidant is selected from the group consisting of 2,2'-Methylene-bis (4-methyl-6-tertiary-butyl phenol) and a 50—50 mixture of mono and dinonylphenyl phosphite.

6. An article in accordance with claim 4, wherein said polyolefin improves the tackification of said solids material.

* * * * *